United States Patent
Tangren

[19]

[11] Patent Number: 5,973,882
[45] Date of Patent: Oct. 26, 1999

[54] MOMENT-FLEX HEAD SUSPENSION

[75] Inventor: John H. Tangren, St. Paul, Minn.

[73] Assignee: Hutchinson Technology, Inc., Hutchinson, Minn.

[21] Appl. No.: 08/774,520

[22] Filed: Dec. 30, 1996

Related U.S. Application Data

[60] Provisional application No. 60/023,515, Aug. 7, 1996.

[51] Int. Cl.[6] ..................................................... G11B 5/48
[52] U.S. Cl. ............................................................. 360/104
[58] Field of Search ..................................... 360/104, 103

[56] References Cited

U.S. PATENT DOCUMENTS

| | | | |
|---|---|---|---|
| 4,399,476 | 8/1983 | King | 360/104 |
| 4,875,121 | 10/1989 | Tanaka et al. | 360/109 |
| 4,996,623 | 2/1991 | Erpelding et al. | 360/104 |
| 5,019,931 | 5/1991 | Ohwe et al. | 360/104 |
| 5,115,363 | 5/1992 | Khan et al. | 360/104 |
| 5,124,864 | 6/1992 | Matsuzaki | 360/104 |
| 5,138,507 | 8/1992 | Zarouri et al. | 360/104 |
| 5,161,076 | 11/1992 | Inmochi et al. | 360/104 |
| 5,198,945 | 3/1993 | Blaeser et al. | 360/104 |
| 5,225,950 | 7/1993 | Crane | 360/104 |
| 5,243,482 | 9/1993 | Yamaguchi et al. | 360/104 |
| 5,282,102 | 1/1994 | Christianson | 360/104 |
| 5,333,085 | 7/1994 | Prentice et al. | 360/104 |
| 5,353,181 | 10/1994 | Frater et al. | 360/104 |
| 5,386,331 | 1/1995 | Wolter | 360/104 |
| 5,428,490 | 6/1995 | Hagen | 360/104 |
| 5,452,158 | 9/1995 | Harrison et al. | 360/104 |
| 5,463,513 | 10/1995 | Hoshino | 360/104 |
| 5,530,605 | 6/1996 | Hamaguchi et al. | 360/104 |
| 5,530,606 | 6/1996 | Baasch et al. | 360/104 |
| 5,537,274 | 7/1996 | Imasaki | 360/104 |
| 5,568,332 | 10/1996 | Khan | 360/104 |
| 5,602,699 | 2/1997 | Khan | 360/104 |
| 5,659,448 | 8/1997 | Shimizu et al. | 360/104 |
| 5,682,279 | 10/1997 | Imasaki | 360/104 |
| 5,710,680 | 1/1998 | Bucska et al. | 360/104 |
| 5,712,748 | 1/1998 | Masse | 360/104 |
| 5,796,558 | 8/1998 | Hanrahan et al. | 360/106 |
| 5,870,258 | 2/1999 | Khan et al. | 360/104 |
| 5,896,248 | 4/1999 | Hanrahan et al. | 360/104 |

FOREIGN PATENT DOCUMENTS

| | | |
|---|---|---|
| 8147645 | 6/1996 | Japan . |
| 8-249850 | 9/1996 | Japan . |
| 9-147510 | 6/1997 | Japan . |
| 9-282626 | 10/1997 | Japan . |
| 10-021663 | 1/1998 | Japan . |
| WO 96/37883 | 11/1996 | WIPO . |

*Primary Examiner*—John H. Wolff
*Attorney, Agent, or Firm*—Faegre & Benson LLP

[57] ABSTRACT

A moment-flex head suspension has a construction that reduces the pitch and roll stiffness of the read/write head support while maintaining the lateral stiffness of the flexure or gimbal of the head suspension sufficiently high.

22 Claims, 4 Drawing Sheets

MOMENT-FLEX HEAD SUSPENSION

The present application claims the benefit of prior filed Provisional application Ser. No. 60/023,515 entitled Moment Flexure Suspension, filed Aug. 7, 1996, now abandoned.

BACKGROUND OF THE INVENTION

(1) Field of the Invention

The present invention pertains to a head suspension for supporting a read/write head adjacent a rotating data storage device, and in particular to a head suspension design that decreases the pitch and roll stiffness of the read/write head support while maintaining a desirable lateral and vertical stiffness of the head suspension.

(2) Description of the Related Art

Most personal computer systems today employ direct access storage devices (DASD) or rigid disk drives for data storage. A conventional disk drive contains a spindle that is rotated by an electric motor at several thousand revolutions of the spindle per minute. One or more magnetically coated recording disks are mounted on the spindle for rotation therewith at axially spaced positions along the spindle.

Positioned adjacent the rotating disks is a head actuator column. The head actuator column typically has a plurality of actuator arms thereon, and each actuator arm supports one or more head suspensions that extend in cantilever fashion from the actuator arm to distal ends of the head suspension. The head suspensions are very precise metal springs that hold read/write heads, such as magnetic or optical heads, adjacent the rotating disks in the disk drive. The head suspensions are typically comprised of a proximal support region that attaches the head suspension to an actuator arm, a distal load region that supports that read/write head, and an intermediate spring region that biases the load region and the read/write head toward the rotating disk. The read/write heads are attached to sliders at the distal ends of each of the head suspensions. The read/write heads of this type usually do not contact the surface of the rotating disk (although contact heads and/or sliders are also used), but instead "fly" on the slider at a precisely maintained microscopic distance above the rotating disk surface. The head suspension maintains the read/write head at a correct flying distance from the surface of the rotating disk because of an equilibrium created between the upward force of an air bearing created by air driven under the slider by the rotation of the disk, and a downward spring bias force applied by the head suspension that is dependent on the head suspension's vertical stiffness.

The surface of a data storage disk is not perfectly flat. The principal function of a head suspension flexure or load beam gimbal is to be compliant in the pitch and roll directions to maintain the slider at its proper attitude and to follow disk surface fluctuations as well as to reduce the effect of load beam motion on the slider. Typically, the pitch motion is permitted by rotation of the slider about a transverse axis to the head suspension and the roll motion is permitted by rotation of the slider about a longitudinal axis to the head suspension.

As slider sizes decrease in size, the supporting air bearing created beneath these sliders also decreases in size, resulting in a decrease in the lift force exerted on the slider. With the lift force of the air bearing decreasing, head suspensions must be designed to be more sensitive to the external torques applied to the slider. In prior art head suspensions, this has been accomplished by reducing the stiffness of the head suspension flexure or load beam gimbal.

The head suspension flexure or gimbal must also have a high lateral (transverse) stiffness to prevent unintended motion of its attached read/write head due to acceleration and deceleration forces exerted on the slider when the head suspension is rapidly moved to position the read/write head at different radial locations on the disk. Even though sliders are becoming increasingly smaller and their mass is becoming smaller, the increased acceleration and deceleration forces cannot be ignored. Also, a high lateral stiffness is required to prevent motion of the slider due to the air flow created by the rotating disk. As disks in disk drives are positioned closer together and their revolution speeds are increased, the air flow created by their rotation is increased. Even though the side surface area of the slider is decreasing, it is not enough to counter the increase in air flow.

It is also necessary that a head suspension have a high vertical stiffness or handling stiffness. This stiffness is required to minimize vertical movement of the head suspension and possible damage to the head suspension from routine handling and from ultrasonic cleaning processes.

Therefore, as head suspension flexures or gimbals are developed having a low pitch and roll stiffnesses for smaller sliders, steps must be taken to avoid reducing the lateral stiffness of the flexure or gimbal without also negatively affecting vertical stiffness thereof. Unfortunately, in the present design of head suspension flexures and load beam gimbals, the lateral and vertical stiffness characteristics are coupled to their pitch and roll stiffness characteristics. If there is a need to change one stiffness component, then another one is also changed. For this reason, the present design of head suspension flexures and load beam gimbals results in a compromise in stiffness due to the difficulty of obtaining the optimum stiffness combinations.

It would therefore be desirable to design a head suspension flexure or load beam gimbal in which the pitch and roll stiffness of the read/write head support is decreased while the lateral stiffness and the vertical stiffness of the flexure or gimbal are maintained at desirable values.

SUMMARY OF THE INVENTION

The present invention is directed to a head suspension that cantilevers a read/write head adjacent a rotating data storage device, where the head suspension has a unique construction that reduces the pitch and roll stiffness of the head support without significantly affecting its lateral stiffness. The head suspension is disclosed in several embodiments, each of which includes pivoting connections between either a flexure or load beam of the head suspension and a head support bond pad provided for attachment to a slider, where the pivoting connections are designed to function as pivoting hinges that are compliant for bending about a pivot axis yet are stiffened against lateral bending motions. Where a flexure is employed, the load beam interacts with the flexure. The load beam dimple makes point contact on the bond pad to provide the desired load to the slider. A surface of the load beam also serves to limit the pitch and roll movements of the slider and bond pad. In a load beam having an integral gimbal, one or more projecting arms may be used to limit rotation of the bond pad about its pitch and roll axes. The pivoting connections are described as being employed on head suspensions comprising load beams and flexures and also head suspensions comprising load beams with integral gimbals provided at their distal ends. The pivoting connections may be constructed by partial etching of materials or by squeezing the material of the head suspension producing a thinning in the material at the pivoting connection, by increasing the stiffness of materials surrounding the pivoting connections by welding material or laminating materials, or other similar known methods or by using rails along the opposite lateral edges of the head suspension with breaks or gaps in the rails where the axis of pivoting motion is desired, or by using a material having a low elastic modulus in the pivoting connection, such as polyimide, copper, aluminum, beryllium and beryllium copper.

In a first embodiment of the invention, the pivoting connections are employed on a head suspension comprising a load beam, a support base plate secured to a proximal end of the load beam, and a flexure secured to a distal end of the load beam. The pivoting connections are employed in the construction of the flexure which is provided at the distal end of the load beam of the head suspension. The flexure is connected by pivoting connections to a head support that serves as a bonding pad for the read/write head slider.

The head support is comprised of a bonding pad and a frame that connects the bonding pad to the flexure. The bonding pad is connected to the frame by a pivoting connector. In this embodiment, the bonding pad and frame are constructed from the same sheet of material, such as stainless steel, as is the pivoting connector between the bonding pad and the frame. The stiffness of the pivoting connector between the bonding pad and frame is reduced by partial etching, thereby giving this pivoting connector a reduced thickness from that of the bonding pad and frame. The reduced thickness of this pivoting connector enables it to bend or pivot freely about a pivot axis that traverses the pivoting connector and is in line with or coaxial with the longitudinal axis or roll axis of the head suspension. The configuration of the pivoting connector, while enabling the bonding pad to pivot freely relative to the frame about the roll axis, resists lateral movement of the bonding pad relative to the frame.

The pair of pivot connectors between the flexure end and the frame are constructed in an identical manner to that of the pivot connector between the bonding pad and frame, i.e. they are constructed by photoetching the material between the flexure and the frame to a reduced thickness. The reduced thickness of these pivoting connectors permits the frame to pivot freely about a pivot axis that traverses these pivot connectors and is in line with or coaxial with the head suspension pitch axis. Although permitting free pivoting movement of the frame relative to the head suspension distal end, this pair of pivot connectors resists lateral movement of the frame relative to the head suspension distal end.

In a variant embodiment of the invention, only a pivot connector between the bonding pad and the flexure at the head suspension distal end is employed permitting pivoting movement of the bond pad about the roll axis relative to the flexure. This embodiment may be employed where it is desired to reduce only the roll stiffness. A variation of this embodiment reducing pitch stiffness only is also possible.

In a further embodiment, pairs of pivoting connectors may be provided on opposite sides of the bonding pad connecting the bonding pad to a frame that completely surrounds the bonding pad. This first pair of pivoting connectors would permit the bonding pad to pivot freely about a pivot axis that passes through both pivoting connectors and is coaxial with either the pitch or roll axis of the head suspension. A second pair of pivoting connectors is provided on opposite sides of the frame and connects the frame to the distal end of the flexure or load beam of a head suspension that does not employ a flexure. This second pair of pivoting connectors in the preferred embodiment is rotated 90° relative to the first pair of pivoting connectors and permits the frame to pivot freely relative to the flexure or load beam distal end about a pivot axis that is coaxial with the other of the pitch or roll axes. The pivot connectors of this embodiment may also be constructed in the same manner as the previously described embodiments.

In each embodiment of the head suspension employing the pivoting connectors of the invention, the pitch and roll stiffness of the read/write head support is reduced while the lateral stiffness is maintained sufficiently high.

BRIEF DESCRIPTION OF THE DRAWINGS

Further objects and features of the present invention are set forth in the following detailed description of the preferred embodiments of the invention and in the drawing figures wherein.

DETAILED DESCRIPTION OF THE PREFERRED EMBODIMENTS

Figure 1:
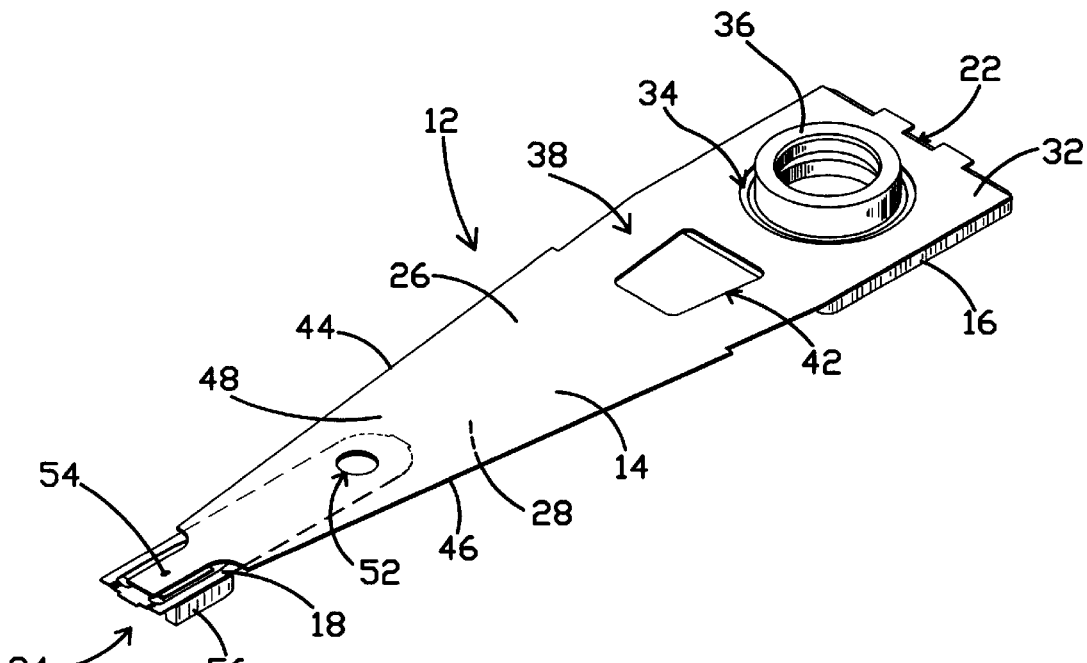
FIG. 1 is an isometric view of a first embodiment of a head suspension of the invention.
Figure 2:
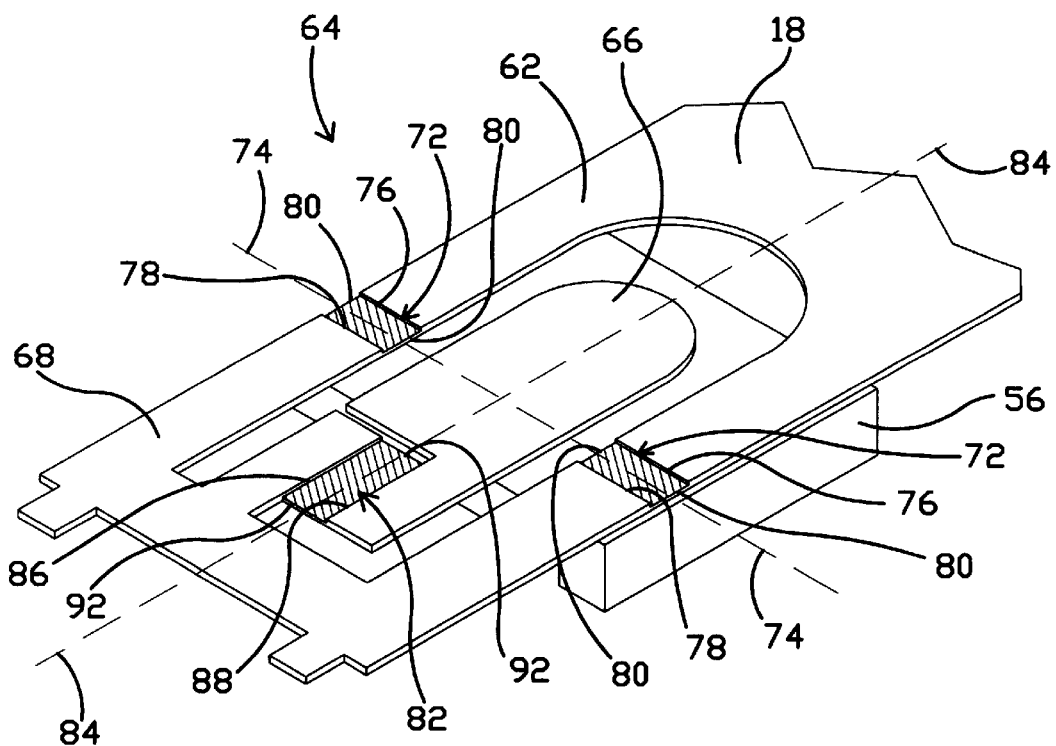
FIG. 2 is a partial isometric view showing the detail of the flexure of the head suspension of FIG. 1 removed from that head suspension.

FIGS. 1 and 2 show a first embodiment of the head suspension 12 of the present invention. The head suspension is basically comprised of a load beam 14, a beam support base plate 16, and a flexure 18. The construction of the head suspension 12 and the specific configurations of its component parts are illustrative only. The novel feature of the invention is in the construction of the flexure distal end shown in FIG. 2, which is considered herein to be the construction of the distal end of the overall head suspension. Although the following description of this embodiment is directed to the particular construction of the flexure distal end, it should be understood that the subject matter of the invention is not limited to use on head suspension flexures, but may also be employed in the construction of load beam distal ends as well as other similar types of applications where it is desirable to reduce the pitch and roll stiffness of a read/write head support of a head suspension while keeping the lateral and vertical stiffness of the head suspension relatively high.

The load beam 14 has a longitudinal length with opposite proximal 22 and distal 24 ends and is constructed of stainless steel having a nominal sheet thickness between 0.051 mm and 0.076 mm. However, the load beam could also be constructed of other conventionally used materials. The load beam has a top surface 26 and a bottom surface 28. A portion of the load beam adjacent its proximal end 22 is constructed as a support region 32. An aperture 34 is provided in this support region and the base plate 16 is secured to this region by welds, as is conventional. A swage boss 36 projects through the aperture 34 provided for it in the support region 32. The swage boss is employed in attaching the head suspension to an actuator arm (not shown), as is conventional. Although the head suspension is disclosed with a base plate 16, it should be understood that the presence of the base plate is not necessary for the functioning of the subject matter of the invention and that the inventive subject matter may be employed on head suspensions that do not require the presence of a base plate.

A spring region 38 is provided in the head suspension by an etched window 42 that passes through the load beam 14 adjacent the support region 32. The spring region 38 of the load beam is also typically rolled or bent downwardly to produce the desired load of the head suspension that biases the load beam distal end 24 downwardly as viewed in FIG. 1. Other methods of producing the spring rate in the head suspension known in the art may be employed, including but not limited to providing partial etched windows or a partial etched trough in the spring region of the load beam. The head suspension 12 as shown in FIG. 1 is basically as it would appear when subjected to the air bearing load which exerts an upwardly directed force against the distal end of the load beam, straightening its downward slant and creating the downward bias of the spring region.

From adjacent the spring region 38 the opposite lateral edges 44, 46 of the load beam taper toward each other as they extend longitudinally to the load beam distal end 24, as is typical in many head suspension constructions. These opposite lateral edges define the rigid load region 48 of the load beam. Depending on the thickness of the sheet material employed in constructing the load beam, it may be desirable to alter the configuration of the opposite lateral edges or provide bent rails (not shown) along the opposite lateral edges of the load region to increase the stiffness of this region of the load beam. It may also be desirable to provide wire guides (not shown) along these opposite lateral edges depending on the particular application of the head suspension. A tooling aperture 52 passes through the rigid region 48 of the load beam adjacent the load beam distal end 24 for use in proper positioning of the flexure 18 relative to the load beam distal end 24 as it is attached to the load beam, as is conventional. A dimple 54 is provided in the load beam top surface 26 and projects downwardly from the load beam bottom surface 28 adjacent the distal end 24.

The flexure 18 is secured to the load beam bottom surface 28 adjacent its distal end 24 by laser welds or other equivalent methods. The flexure supports the slider 56 and transducer head (not shown) as is known in the art. The novel feature of the head suspension shown in FIGS. 1 and 2 is the particular construction of the distal end of the flexure 18 shown in FIG. 2, which although shown at the distal end of a flexure, could be provided at the distal end of a load beam in a head suspension that does not employ a flexure. Therefore, where a head suspension distal end is referred to, it is intended to mean the distal end of a flexure of the head suspension, or the distal end of a load beam of the head suspension.

As shown in greater detail in FIG. 2, the head suspension distal end 62 is connected to a head support 64, that in the embodiment of FIG. 2 is comprised of both a bond pad 66 and a frame 68. The bond pad 66, the frame 68, and the head suspension distal end 62 are all constructed unitarily of a single sheet of material. The particular configuration of the bond pad 66 shown is illustrative only. It is only necessary that the head support base 66 have a configuration that enables it to serve as an attachment for the slider 56 which is secured to the underside of the bond pad 66 by any known method in the position shown in FIG. 2.

The head suspension distal end 62 is connected to the frame 68 by a pair of first pivot connectors 72. In this embodiment shown, the first pivot connectors 72 are constructed by partial etching of the material from which the head suspension distal end 62 and the head support 64 are constructed to a reduced thickness of that material in the area of the first pivot connectors 72. The reduced thickness of these first pivot connectors 72 reduces the stiffness of the connectors. With the positioning of the first pivot connectors 72 shown in FIG. 2, their reduced stiffness will enable the head support 64, and in particular the frame 68, to pivot relative to the head suspension distal end 62 about a pivot axis 74 which defines or is coaxial with the pitch axis of the slider 56. Note that movement of the head support 64 relative to the head suspension distal end 62 about the pitch pivot axis 74 subjects the first pivot connectors 72 to a bending moment about the axis 74 as opposed to torsional twisting of the connectors about the axis. Each of the first pivot connectors 72 are etched with longitudinal lengths between first ends 76 of the connectors connected to the head suspension distal end 62 and second ends 78 of the connectors connected to the head support 64 and, more specifically the frame 68. The pivot axis 74 of the first pivot connectors 72 traverses the connectors without intersecting the connectors' first and second ends 76, 78. Also note that the lengths of the connections of the first pivot connectors first and second ends, 76, 78 to the respective head suspension distal end 62 and head support 64 are longer than their laterally opposite edges 80. These relative dimensions enhance the resistance to lateral movement of the head support 64 relative to the head suspension distal end 62.

A second pivot connector 82 connects the bond pad 66 to the frame 68 for relative pivoting movement of the bond pad to the frame about a pivot axis 84 that also defines or is coaxial with the roll axis of the slider 56. The second pivot connector 82 is constructed by partial etching of the material employed in forming the head suspension distal end 62 and the head support 64, just as in forming the first pivot connectors 72. As with the first pivot connectors, the second pivot connector 82 has a length with opposite first 86 and second 88 ends where the first end 86 is connected to the frame 68 and the second end 88 is connected to the bond pad 66. The second pivot connector has a configuration that enables the bond pad 66 to pivot relative to the frame 68 about the pivot axis 84, where the pivot axis 84 traverses the second pivot connector 82 without intersecting its first and second ends 86, 88. With the particular configuration of the second pivot connector 82 shown in FIG. 2, the lengths of its first and second ends 86, 88 are significantly larger than the lengths of its longitudinally opposite ends. These relative dimensions enhance the ability of the second pivot connector 82 to resist lateral movement of the bond pad 66 to the frame 68.

With the construction of the moment-flex head suspension shown in FIGS. 1 and 2, the reduced stiffness and increased flexibility of the first and second pivot connectors 72, 82 will allow the slider 56 to hang suspended below the head suspension distal end 62 when the slider is not loaded by the air bearing during operation of the disk drive. The dimple 54 provided at the head suspension distal end will limit the extent to which the slider 56 is permitted to hang below the suspension distal end 62 by the first and second pivot connectors 72, 78 and will also limit the pivoting movement of the slider 56 about the pitch axis when the slider is loaded. In referring to FIG. 2, it can be seen that when unloaded, the frame 68 will pivot downwardly about the pitch axis 74, causing its connection to the bond pad 66 by the second pivot connector 82 to raise up the bond pad 66 to which the slider 56 is attached. The dimple 54 engages against the top surface of the bond pad 66. Where a flexure is employed, the load beam can be relied on to maintain and/or stabilize the vertical stiffness of the flexure. The portion of the load beam that extends over the flexure acts as a limiter that keeps the bond pad from rotating too far about the pitch and roll axes. Other structures may be used for limiting the movements of the bond pad, if desired; although it is not necessary that the bond pad be limited at all for performance of the flexure in a disk drive.

In a variation of the moment-flex head suspension of FIGS. 1 and 2, the reduced thickness and reduced pitch and roll stiffness of the first and second pivot connectors 72, 82, may be constructed by building up the thickness of the head suspension distal end 62, the frame 68 and the bonding pad 66. For example, the head suspension distal end 62, frame 68, and bond pad 66 could first be constructed unitarily together with the first and second pivot connectors 72, 82 of a thin sheet of material where the thickness of the material will give the first and second pivot connectors their desired reduced pitch and roll stiffness. The head suspension distal end 62, the bond pad and the frame 68 may then be built up by welding one or more laminate layers to these component parts of the head suspension, thereby increasing their stiffness relative to the stiffness of the first and second pivot connectors. Also, the reduced itch and roll stiffness of the first and second pivot connectors may be constructed by increasing the stiffness of materials surrounding the pivoting connections by sing rails along the opposite lateral edges of the head suspension with breaks or gaps in the rails where the axis of pivoting motion is desired as described earlier.

Furthermore, the pivoting connections may be constructed by squeezing the material of the head suspension producing a thinning in the material at the pivoting connection, as described earlier.

As a further alternative to the pivot connectors 72, 82, the reduced thickness of sheet material employed in forming these connectors may be replaced entirely by a material having a lower elastic modulus, for example polyimide, copper, aluminum, beryllium and beryllium copper or other such materials.

In certain applications of the moment-flex head suspension, it may not be desirable to reduce both the pitch and roll stiffness of the read/write head support. In these situations, simply removing the first pivot connectors or the second pivot connector of the FIG. 2 embodiment may provide the desired head support pitch and roll stiffness values. Also it may be desirable to reduce the pitch axis stiffness more than the roll axis stiffness, or vice versa. This can be done by adjusting the thickness of the first and second pivot connections separately, or using different methods to adjust the stiffness of the first and second pivot connections. It is also not necessary that there be two sets of pivot connectors positioned perpendicular to each other. The axis of the connectors may have an angular orientation desired for a particular purpose, and there may be only one pivot axis or three or more pivot axes. The flexure 18 may also be provided with one or more offets (not shown) within any of the structure that supports the bond pad for spacing the bond pad from the flexure support structure, such as, for example, to provide dimple clearance.

Figure 3:
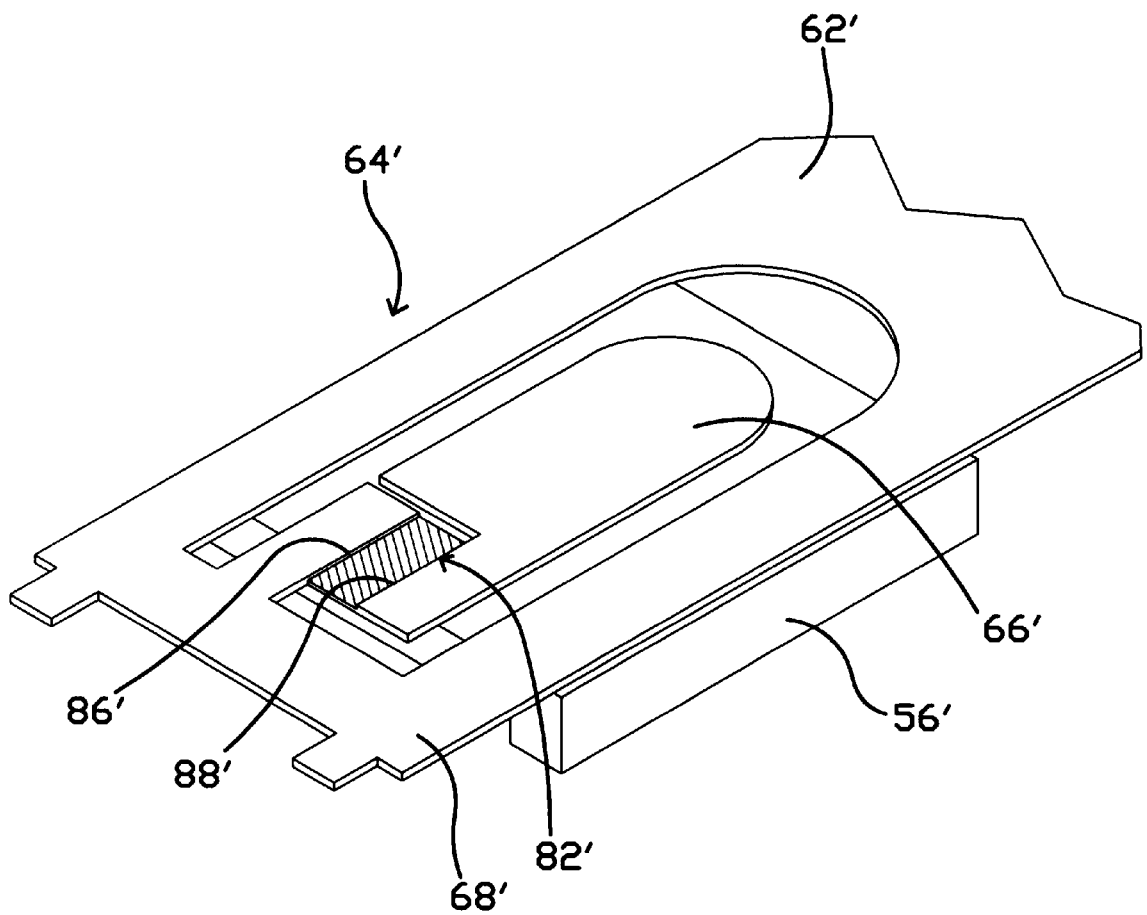
FIG. 3 is a partial isometric view showing the detail of a variant embodiment of the flexure of FIG. 2.

Such a variant embodiment is illustrated in FIG. 3 where like component parts to those of the FIG. 2 embodiment are identified by the same reference numbers followed by a prime ('). In the embodiment of FIG. 3, the only difference from that of the embodiment of FIG. 2 is that the first pivot connectors 72 of the FIG. 2 embodiment are removed, leaving the head suspension distal end 62' connected directly to the bond pad 64', in particular the frame 68' by the second pivot connector 82'. In this embodiment, the roll stiffness of the bond pad 64' is reduced while keeping the pitch stiffness of the head suspension. It should be apparent that modifying the FIG. 2 embodiment by removing the second pivot connector 82 leaving the bond pad 66 directly connected to the frame 68 by the first pivot connectors 72 will produce a moment-flex head suspension in which only the pitch stiffness is reduced.

Figure 4:
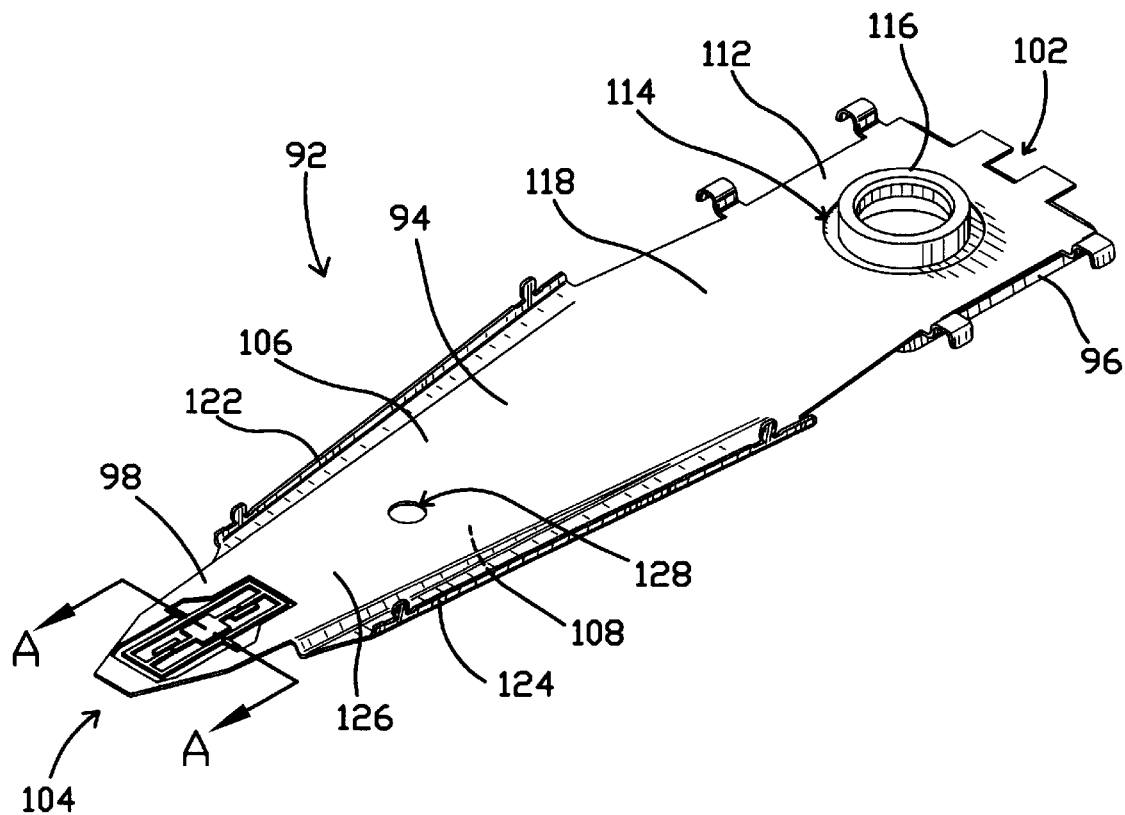
FIG. 4 is an isometric view of a further embodiment of the head suspension of the invention.
Figure 5:
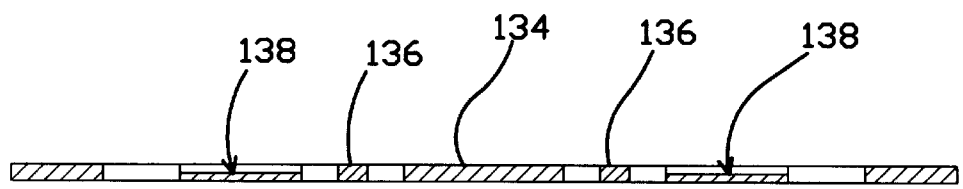
FIG. 5 is a cross-sectional view of the head suspension of FIG. 4 taken in a plane extending along the line A—A of FIG. 4.
Figure 6:
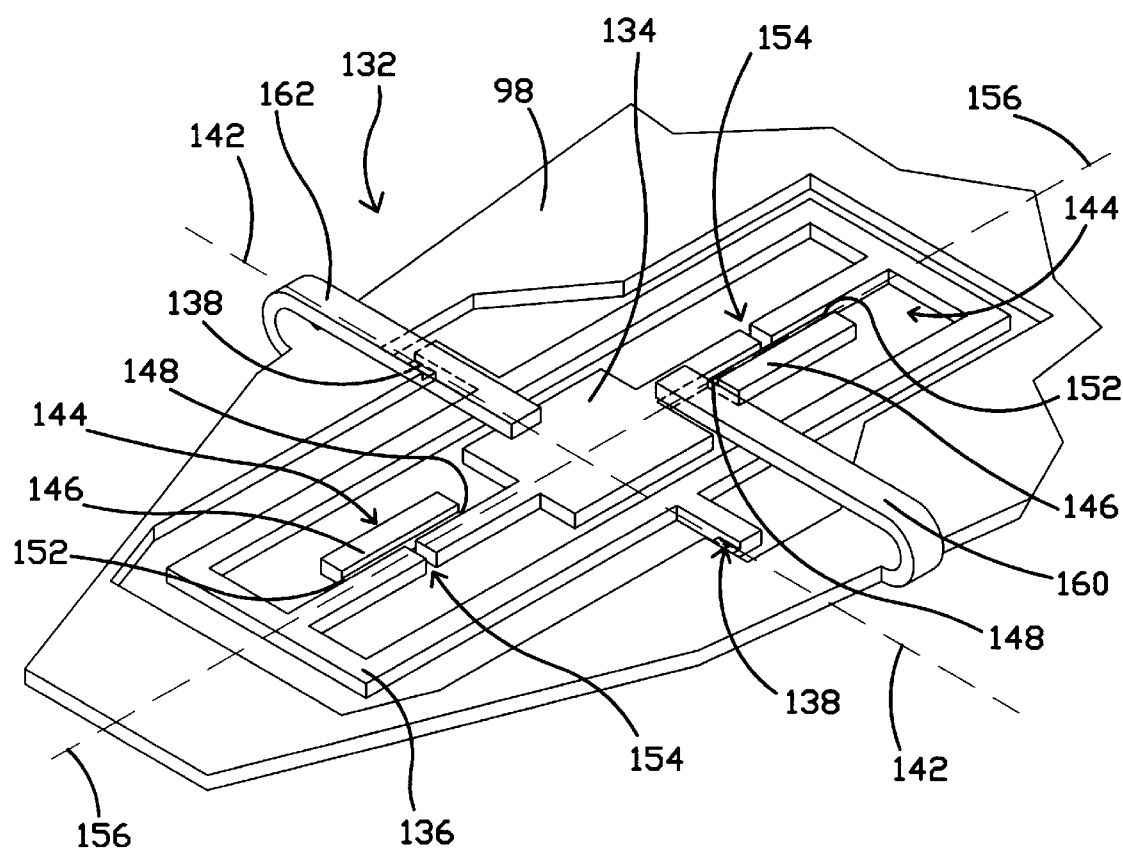
FIG. 6 is a partial isometric view showing a modified detail of the distal end of the head suspension similar to that of FIG. 4.

FIGS. 4–6 show a further embodiment of the moment-flex head suspension 92 of the present invention. This suspension is basically comprised of a load beam 94 and a beam support base plate 96. The construction of the head suspension 92 and the specific configuration of its component parts are illustrative only. The novel feature of this embodiment is in the construction of the head suspension distal end 98. As with the previously described embodiments, it should be understood that the particular construction of the head suspension distal end 98 is not limited to the particular head suspension shown in FIGS. 4–6, but may also be employed in the construction of other types of load beam distal ends as well as flexure distal ends and other similar types of applications where it is desirable to reduce the pitch and roll stiffness of a read/write head support of a head suspension while minimalizing the effect on the lateral and vertical stiffness of the head suspension. As set forth earlier, the use of "head suspension distal end" is therefore intended to mean both the distal end of a flexure and the distal end of a load beam of a head suspension.

The load beam 94 has a longitudinal length with opposite proximal 102 and distal 104 ends and is constructed of stainless steel. However, the load beam could also be constructed of other conventionally used materials. The load beam has a top surface 106 and a bottom surface 108. A portion of the load beam adjacent its proximal end 102 is constructed as a support region 112 and an aperture 114 is provided in this region. The base plate 96 is secured to the bottom surface of the beam at the support region 112 and a swage boss 116 projects through the support region aperture 114. Although the head suspension is disclosed with a base plate, it should be understood that the presence of a base plate may not be necessary for all applications of the head suspension.

A spring region 118 is provided in the head suspension adjacent the support region 112. In this illustrative embodiment, the material of the load beam 94 is sufficiently thin to enable the spring region 118 to be constructed in the head suspension by rolling or bending the material of the load beam at the spring region to produce the desired spring rate of the head suspension that biases the load beam distal end 104 downwardly as viewed in FIG. 4. Alternatively, other known methods of obtaining a desired spring rate in a head suspension may be employed. The head suspension 92 as shown in FIG. 4 is basically as it would appear when subjected to the air bearing load which exerts an upwardly directed force against the distal end of the load beam, straightening its downward slant and creating the downward bias of the spring region 118.

From adjacent the spring region 118, the opposite lateral edges 122, 124 of the load beam taper toward each other as they extend to the load beam distal end 104, as is typical in many head suspension constructions. With the reduced thickness of the sheet material employed in constructing the load beam, the opposite lateral edges 122, 124 are constructed as bent rails that increase the stiffness of the load region 126 of the load beam defined by these rails. A tooling aperture 128 passes through the load region 126 of the load beam. The novel feature of the head suspension 92 shown in FIGS. 4–6 is the articular construction of the head suspension distal end 98 shown in detail in FIG. 6.

The head suspension distal end 98 is connected to a head support 132 comprised of a bond pad 134 and a frame 136. The bond pad 134, the frame 136, and the head suspension distal end 98 are all constructed unitarily of the single sheet of material from which the load beam 94 is constructed. The particular configuration of the bond pad 134 shown is illustrative, it only being necessary that the bond pad have a configuration that enables it to be attached to a slider (not shown) which is secured to the underside of the bond pad by any known method.

The head suspension distal end 98 is connected to the frame 136 by a pair of first pivot connectors 138 in the same manner as the first described embodiment of FIGS. 1 and 2. The first pivot connectors 138 are constructed by partial etching of the material from which the head suspension distal end 98 and the head support 132 are constructed to reduce the thickness of the material in the area of the first pivot connectors 138. With the positioning of the first pivot connectors 138 shown in FIG. 6, their reduced stiffness will enable the head support 132, and in particular the frame 136, to pivot relative to the head suspension distal end 98 about a pivot axis 142 which defines and is coaxial to the pitch axis of the head suspension. As in the first described embodiment, movement of the head support 132 relative to the head suspension distal end 98 about the pivot axis 142 subjects the first pivot connectors 138 to a bending moment about the axis 142 as opposed to a torsional twisting of the connectors about the axis. Each of the first pivot connectors 138 of this embodiment are constructed in the same manner as the first pivot connector 72 of the first described embodiment, and therefore their construction in the FIG. 6 embodiment will be described in only general detail. Each of the first pivot connectors 138 are etched with longitudinal lengths between first ends of the connectors connected to the head suspension distal end 98 and second ends of the connectors connected to the head support 132, more specifically the frame 136. The pivot axis 142 of the first pivot connectors traverses the connectors without intersecting the connectors first and second ends. Also, the lengths of the connections of the first pivot connectors first and second ends to the respective head suspension distal end 98 and head support 132 are longer than their laterally opposite edges. As explained earlier, these relative dimensions enhance the resistance to lateral movement of the head support 132 relative to the head suspension distal end 98.

Second pivot connectors 144 connect the bond pad 134 to the frame 136 for relative pivoting movement of the bond pad to the frame about a pivot axis 146 that defines and is coaxial to the roll axis of the head suspension. The second pivot connectors 144 are also constructed by partial etching of the material employed in constructing the head suspension distal end 98 and the head support 132, just as is in the first described embodiment. However, the second pivot connectors are illustrated differently from those of the first described embodiment to show an alternative concept. They are each comprised of a crosstree member 146, a first pivoting ember 148 and a second pivoting member 152. The basic function of the second pivot connectors 144 is equivalent to that of the first pivot connectors 138. As seen in FIG. 6, each of the crosstrees 146 are positioned adjacent portions of the bond pad 134 and the frame 136. The first pivoting member 148 connects the crosstree 146 to the bond pad 134 and the second pivoting member 152 connects the crosstree 146 to the frame 136 on opposite sides of the gap 154 between the bond pad and the frame. The first and second pivoting members are constructed by partial etching of the material from which the head suspension distal end 98, the head support 132, and the crosstrees 146 are constructed to a reduced thickness of that material in the area of the first and second pivoting members 148, 152. The reduced thickness of the first and second pivoting members 148, 152 reduces the stiffness of these members. With the positioning of the first and second pivoting members 148, 152 shown in FIG. 6, their reduced stiffness will enable the bond pad 134 to pivot relative to the frame 136 about a pivot axis 156 which defines and is coaxial to the roll axis of the head suspension. Movement of the bond pad 134 relative to the frame 136 about the roll axis 156 subjects the first and second bending members 148, 152 to a bending moment about the axis 156 as opposed to a torsional twisting of the members about the axis. The roll axis 156 traverses the first and second pivoting members 148, 152 without intersecting the opposite ends of the members that connect them from the crosstree 146 to the bond pad 134 and frame 136, respectively. As in the previously described embodiments, the lengths of the connections of the first and second pivoting members 148, 152 to the crosstree 146, bond pad 134, and frame 136 are longer than their laterally opposite edges and these relative dimensions enhance the resistance to lateral movement of the bond pad 134 to the frame 136.

Although the first pivot connectors 138 and the first and second pivoting members 148, 152 of the second pivot connectors 144 in the embodiment of the head suspension shown in FIGS. 4–6 are given their reduced stiffness by partially etching these connectors, the reduced stiffness of these connectors may also be obtained by the alternative constructions of the connectors described in the first embodiment of the invention. Where a material having a low elastic modulus is employed in a pivoting connector, and the particular material employed expands or contracts more than the stainless steel of the bond pad 134, frame 136 or head suspension distal end 98, the particular construction of the second pivot connectors 144 may be more desirable. In referring to FIG. 6, it can be seen that the expansion or contraction of the first and second pivoting embers 148, 152 of the second pivoting connector 144 will cause the crosstree 146 to move relative to both the bond pad 134 and the frame 136, but will not cause the bond pad and frame to move relative to each other. Therefore, the particular construction of the second pivoting connectors 144 is well suited for use with low elastic modulus materials employed as the pivoting members where these materials have an expansion or contraction rate that is different from that of the materials employed in constructing the bond pad, frame and head suspension distal end.

Furthermore, it should be understood that the second pivoting connectors 144 of the FIG. 6 embodiment ay be replaced with pivoting connectors constructed in the same manner as the first pivoting connectors 138 shown in FIG. 6. The construction and functioning of these pivoting connectors would be substantially the same as those described in the first embodiment of the invention. Offets (not shown) may also be provided within any of the structure that supports the bond pad for spacing the bond pad from the flexure support structure.

In order to limit the movement of the slider bond pad 134 about its pitch and roll axes, particularly during handling or under shock loads, limiters are preferably provided, see for example the limiters 160 and 162 illustrated in FIG. 6. Many other types of limiters and structures therefor may be used, if desired; although the limiters are not necessary for performance within a disk drive. The benefit of providing limiters is to prevent the bond pad from excessive motion that may occur particularly in light of the low pitch and roll stiffnesses obtained in accordance with the present invention. Thus, the limiters 160 and 162 preferably do not contact the slider bond pad 134 so as not to interfere with normal pitch and roll fluctuations during operation within a disk drive.

While the present invention has been described by reference to a specific embodiment, it should be understood that modifications and variations of the invention may be constructed without departing from the scope of the present invention. The present invention can be used for flying type head suspensions as well as for contact type head suspensions, where the reduced stiffnesses of the defined axis or axes can more easily permit a head(magnetic, optical or otherwise) to follow the surface of any medium.

What is claimed is:

1. A head suspension for supporting a read/write head adjacent a data storage device, the head suspension having a longitudinal length with opposite proximal and distal ends, a head support at the head suspension distal end, and a pivoting connector connecting the head support to the head suspension distal end for pivoting movement of the head support relative to the head suspension distal end about a pivot axis that traverses the pivoting connector, the head support and the head suspension distal end having a first thickness and the pivoting connector having a second thickness less than the first thickness.

2. The head suspension of claim 1, wherein:
the head suspension distal end and the head support both have a greater stiffness than the pivoting connector.

3. The head suspension of claim 1, wherein:
the head suspension distal end and the head support are connected to the pivoting connector on opposite sides of the pivot axis.

4. The head suspension of claim 1, wherein:
the pivoting connector has a first end connected to the head suspension distal end and a second end connected to the head support, and the pivot axis traverses the pivoting connector between its first and second ends and does not intersect the first and second ends.

5. The head suspension of claim 1, wherein:
the head suspension includes a load beam connected by the pivoting connector to the head support, and the load beam, pivoting connector, and the head support are all constructed unitarily from a single sheet of material.

6. The head suspension of claim 1, wherein:
the pivoting connector is constructed entirely of a material having a lower elastic modulus than that of the material of the head suspension and the head support.

7. The head suspension of claim 6, wherein:
the material of the pivoting connector is polyimide.

8. The head suspension of claim 1, wherein:
the head suspension includes a flexure connected by the pivoting connector to the head support, and the flexure, pivoting connector, and the head support are all constructed unitarily from a single sheet of material.

9. The head suspension of claim 8, wherein:
the flexure and the head support both have a first thickness and the pivoting connector has a second thickness that is smaller than the first thickness.

10. The head suspension of claim 1, wherein:
the head support includes a bond pad and a frame and the pivoting connector is a first pivoting connector of a pair of pivoting connectors including the first pivoting connector and a second pivoting connector, the first pivoting connector connects the frame to the head suspension distal end for pivoting movement of the head support frame relative to the head suspension distal end about a first pivot axis that traverses the first pivoting connector between the frame and the head suspension distal end, and the second pivoting connector connects the bond pad to the frame for pivoting movement of the bond pad relative to the frame about a second pivot axis that traverses the second pivoting connector.

11. The head suspension of claim 10, wherein:
the head suspension distal end and the frame are connected to the first pivoting connector on opposite sides of the first pivot axis.

12. The head suspension of claim 11, wherein:
the frame and the bond pad are connected to the second pivoting connector on opposite sides of the second pivot axis.

13. The head suspension of claim 10, wherein:
the first pivoting connector has a length with opposite first and second ends, the first pivoting connector first end is connected to the head suspension distal end and the first pivoting connector second end is connected to the frame, and the first pivot axis traverses the first pivoting connector between its first and second ends and does not intersect its first and second ends.

14. The head suspension of claim 13, wherein:
the second pivoting connector has a length with opposite first and second ends, the second pivoting connector first end is connected to the head support frame and the second pivoting connector second end is connected to the bond pad and the second pivot axis traverses the second pivoting connector between its first and second ends and does not intersect its first and second ends.

15. The head suspension of claim 10, wherein:
the first pivot axis and the second pivot axis are perpendicular to each other.

16. The head suspension of claim 15, wherein:
the crosstree is positioned on one side of the pivot axis and the connection of the frame to the first pivoting member and the connection of the bond pad to the second pivoting member are on an opposite side of the pivot axes from the crosstree.

17. The head suspension of claim 10, wherein:
the second pivoting connector is comprised of a first pivoting member, a second pivoting member, and a crosstree; the first pivoting member is connected between the frame and the crosstree and the second pivoting member is connected between the crosstree and the bond pad.

18. The head suspension of claim 17, wherein:
the pivot axis traverses the first and second pivoting members.

19. The head suspension of claim 17, wherein:
the first pivoting member has opposite first and second ends, its first end is connected to the frame and its second end is connected to the crosstree; the second pivoting member has opposite first and second ends, its first end is connected to the bond pad and its second end is connected to the crosstree; and the pivot axis traverses the first and second pivoting members between their first and second ends and does not intersect their first and second ends.

20. The head suspension of claim 17, wherein:

the first and second pivoting members are constructed of a material having a lower elastic modulus than the material of the frame and the bond pad.

21. The head suspension of claim 20, wherein:

the material of the first and second pivoting members is polyimide.

22. The head suspension of claim 17, wherein:

the head suspension includes a load beam, the head suspension distal end is a distal end of the load beam, and the load beam distal end is connected to the frame by the first pivoting member.

* * * * *